March 22, 1966 R. N. GHOSE 3,242,430
ORTHOGONAL ANTENNA SIGNAL COMBINING ARRANGEMENT
USING PHASE-LOCKED LOOPS
Filed Dec. 30, 1960 2 Sheets-Sheet 1

RABINDRA N. GHOSE
INVENTOR.

BY
ATTORNEY

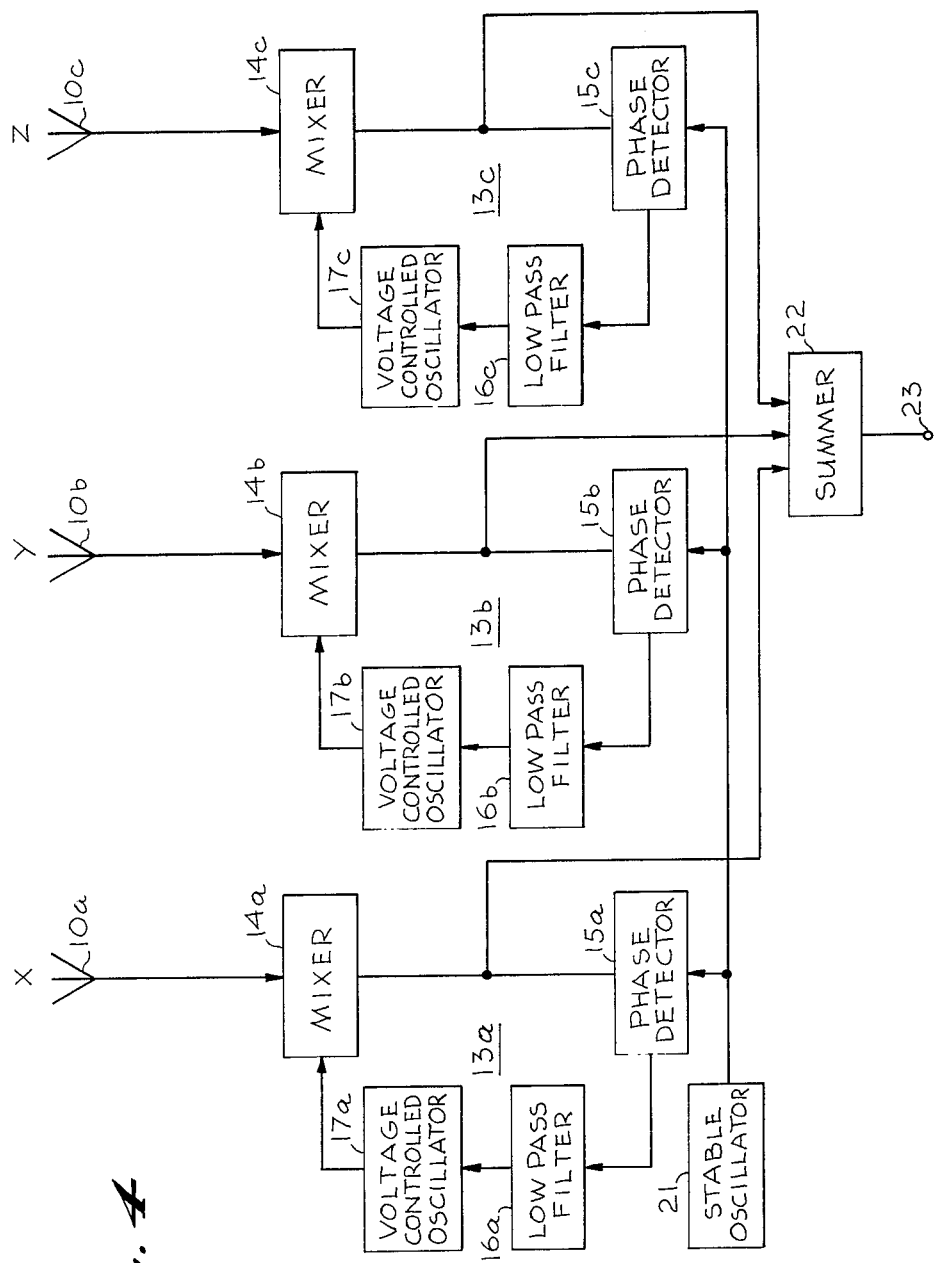

United States Patent Office 3,242,430
Patented Mar. 22, 1966

3,242,430
ORTHOGONAL ANTENNA SIGNAL COMBINING ARRANGEMENT USING PHASE-LOCKED LOOPS
Rabindra N. Ghose, Los Angeles, Calif., assignor to Space-General Corporation, El Monte, Calif., a corporation of California
Filed Dec. 30, 1960, Ser. No. 79,621
4 Claims. (Cl. 325—305)

The present invention relates to an antenna arrangement whose signal output is not affected by the aspect and orientation of a vehicle on which the antenna arrangement is installed.

When a satellite antenna is not spin-stabilized or when it tumbles in space, the field strength received by any existing antenna system undergoes a wide variation and, in some cases, the received field intensity becomes vanishingly small, thereby jeopardizing the communication between the ground and the spacecraft or satellite or, at least, the reliability of this communication is jeopardized. The present invention provides a solution to this problem.

According to the basic concept of the invention, an incoming signal is divided into components in accordance with a particular reference system. These component signals are then processed and recombined in such a manner that the magnitude of the resultant output signal is at all times substantially equal to at least the absolute value of the received signal, that is to say, the magnitude of the resultant output signal is no longer a function of the direction from which the incoming signal is received relative to the antennas. This result is achieved by making the above said processing and combining of the component signals tantamount either to taking the square root of the sum of the squares of the absolute values of the component signals or to linearly adding the absolute values of these components. By so doing, substantially full or maximum signal strength is at all times obtained, irrespective of the direction from which the incoming signal has come relative to the antenna system.

More specifically, in one embodiment of the invention, a three-dimensional orthogonal system of reference is employed having the well-known $x$, $y$ and $z$ axes of reference. Antennas are respectively positioned on these axes and suitably oriented so that $x$, $y$ and $z$ components of the received signal are produced by them. In processing these signal components, one component is shifted in phase by 90 degrees and then linearly added to a second of the three components, thereby producing a fourth signal. The third signal component and this fourth signal are respectively applied to phase-locked loops by means of which the third and fourth signals are brought into phase agreement with a reference signal. Following the phase-locked loops, the third signal component is applied through a 90 degree phase shifter to a summer circuit, the fourth signal being applied directly to the summer. In the summer, the third and fourth signals are linearly added to produce the desired output. The effect of all this is to produce an output signal which, as was previously mentioned, has substantially the same magnitude as that of the incoming signal irrespective of the direction from which the incoming signal is received.

In another embodiment, the three signal components produced by the $x$, $y$ and $z$ antennas are respectively applied directly to these phase-locked circuits. The signal generated by a very stable oscillator is also applied to the three phase-locked circuits wherein it is used as a signal reference. As a result, the antenna signals are ultimately brought into phase agreement with the reference signal and, therefore, into phase agreement with each other. Once aligned in phase, the components are linearly added, thereby producing a final output that is, neglecting minor losses, at least equal in magnitude to the absolute value of the incoming signal.

It is thus seen that the present invention makes it possible to at all times receive a maximum signal regardless of the position and orientation of an antenna assembly in a three-dimensional inertial space. A further advantage produced by the present invention is that a considerable antenna gain can be realized by using a number of antenna assemblies of the type briefly mentioned above, that is to say, by positioning and orienting antennas along a plurality of reference systems that are appropriately displaced from each other. The gain is produced by adding together the outputs from the different antenna assemblies or arrangements. A further advantageous outgrowth of the present invention is that the performance of an antenna arrangement is not affected by the lack of a signal in any one of the antenna elements. Still other advantages are available such as, for example, the fact that embodiments of the invention are entirely electronic in nature and, therefore, involve no mechanically moving parts.

It is, therefore, an object of the present invention to provide an antenna arrangement by means of which a signal will at all times be received at maximum possible signal strength.

It is another object of the present invention to provide an antenna system that exhibits the properties of omnidirectional antennas but which can, nevertheless, be arranged to produce an antenna gain.

The novel features which are believed to be characteristic of the invention, both as to its organization and method of operation, together with the further objects and advantages thereof, will be better understood from the following description considered in connection with the accompanying drawings in which embodiments of the invention are illustrated by way of example. It is to be expressly understood, however, that the drawings are for the purpose of illustration and description only and are not intended as a definition of the limits of the invention.

FIGURE 4 shows another embodiment of the present invention.

Figure 1:
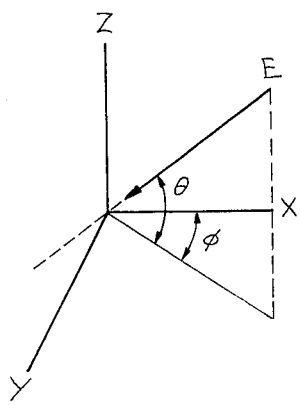
FIGURE 1 illustrates an orthogonal reference system along which antennas may be positioned and oriented and also shows a vector representing an incoming signal.

Considering now the drawings, reference is made to FIG. 1 wherein the $x$, $y$ and $z$ axes of an orthogonal reference system is shown. Also shown, is a vector E representing an incoming signal, E representing the magnitude of the signal. The angle between vector E and its projection onto the $xy$ plane is designated $\theta$ and, similarly, the angle between the projection of the vector E upon the $xy$ plane and the $x$ axis is designated $\phi$. Accordingly, it will be recognized that the $x$, $y$ and $z$ components of the incoming signal are:

$$E_x = E \cos \theta \cos \phi e^{j\omega t} \quad (1)$$
$$E_y = E \cos \theta \sin \phi e^{j\omega t} \quad (2)$$
$$E_z = E \sin \theta e^{j\omega t} \quad (3)$$

where $e$ is the base in the natural logarithmic system and is equal to 2.718; $j$ is the square root of minus one, that is $\sqrt{-1}$; $\omega$ is $2\pi f$, $f$ being the frequency of the incoming signal; and $t$ is time.

Figure 2:
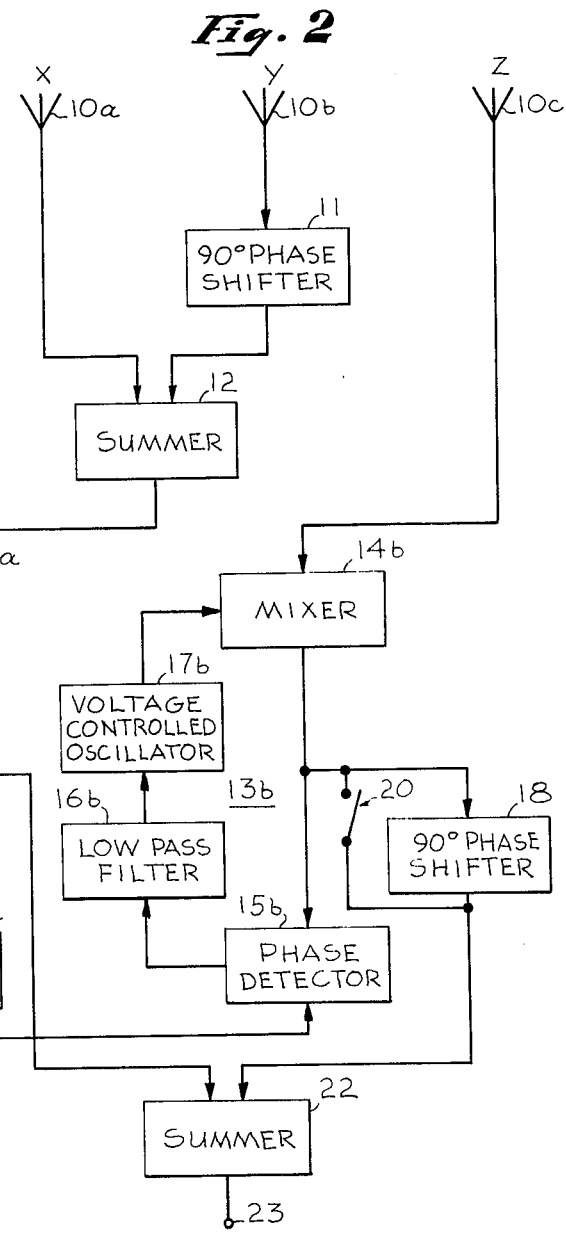
FIGURE 2 shows an embodiment of the present invention using the system of reference illustrated in FIG. 1.

The significance of the values in Equations 1, 2 and 3 will be more clearly discernible in the course of understanding the embodiment shown in FIG. 2. Accordingly, reference is made to FIG. 2 wherein the embodiment is shown to include a plurality of three antennas respectively designated 10a, 10b and 10c, the lengths of these antennas being small compared to the wavelengths of the incoming signal. More specifically, the antenna lengths must be less than one-half the signal wavelength to be effective and preferably a quarter wavelength or less. Dipole type antennas may be used but the invention is not limited to this type alone. Antennas 10a, 10b and 10c are respectively positioned on axes $x$, $y$ and $z$ and are oriented on these axes so that each antenna receives only its axial component of the incoming signal. Antenna 10b is coupled through a 90 degree phase-shifter circuit 11 to an adder or summer circuit 12. Antenna 10a, on the other hand, is connected directly to summer circuit 12. The function of circuit 11 is to shift the phase of signals applied to it by 90° timewise, that is, not spatially but in time. Another way of stating it is that circuit 11 produces a quarter wavelength delay in signals applied to it. The output of the summer circuit is connected to a phase-locked loop which is generally designated 13a. With respect to antenna 10c, this antenna is connected to another phase-locked loop generally designated 13b.

Phase-locked loop 13a includes a first mixer circuit 14a, a phase detector circuit 15a, a low-pass filter 16a and a voltage-controlled oscillator 17a, the elements mentioned being arranged to form a closed circuit or loop. More specifically, mixer 14a and phase detector 15a each have first and second input terminals, the first input to mixer 14a being connected to the output end of summer 12 and the first input to phase detector 15a being connected to the output end of the mixer. Low-pass filter 16a is coupled between the output end of phase detector 15a and voltage-controlled oscillator 17a, the output end of the oscillator being connected to the second input to mixer 14a. The closed phase-locked loop 13a is thus formed. Phase-locked loop 13b is identical and, therefore, similarly includes a mixer circuit 14b, a phase-detector circuit 15b, a low-pass filter 16b and a voltage-controlled oscillator 17b, the circuit elements of this loop being interconnected in exactly the identical manner as the elements of loop 13a. Consequently, to avoid redundancy, it is not deemed necessary to describe phase-locked loop 13b in any greater detail.

The output end of mixer 14b is coupled through a 90 degree phase-shifter circuit 18 to a second summer circuit 22, the output end of mixer 14a being connected directly to this second summer circuit. The function of circuit 18 is the same as that of phase-shifter circuit 11, namely, to shift the phase of signals applied to it by 90° in time. The output terminal of summer circuit 22 constitutes the output for the entire system and is designated 23. Finally, a switch mechanism 20 and a stable oscillator 21 are included in the arrangement, the switch mechanism being connected in parallel with phase-shifter circuit 18 for by-passing purposes and the stable oscillator being connected to the second inputs to phase detectors 15a and 15b. The switch is preferably in an open condition initially.

In considering the operation, it must first be mentioned that because the antennas are small in comparison with the wavelength of the incoming signal and, furthermore, because of the closeness to each other with which the antennas are positioned, the signals produced by the antennas are substantially in phase with each other timewise, that is to say, the $x$, $y$ and $z$ components of the incoming signal rise and fall together. However, generally speaking, the magnitudes of the three components differ from each other, the respective magnitudes being a function not only of the magnitude E of the incoming signal but also of the angles between the incoming signal and the antennas. As previously stated, the object of the present invention is to provide a resultant output signal whose magnitude is independent of the magnitudes of the individual components, that is to say, independent of the angles formed between the antennas and the incoming signal.

Accordingly, when a signal is intercepted by the antennas, the $x$ component of the signal, hereinafter referred to as $E_x$, is developed by antenna 10a and the magnitude of this component is $E \cos \theta \cos \phi$, as previously indicated. In a similar manner, $y$ and $z$ components of the intercepted signal, respectively designated as $E_y$ and $E_z$, are developed by antennas 10b and 10c and the magnitudes of these signal components are respectively $E \cos \theta \sin \phi$ and $E \sin \theta$. Signal component $E_y$ has its phase shifted by 90 degrees in phase-shifter circuit 11 so that the mathematical quantity representing the magnitude of $E_y$, namely, $E \cos \theta \sin \phi$, may now be prefixed by the mathematical unit $j$ which indicates that $E_y$ has experienced a 90° phase shift, that is, that the signal component out of circuit 11 is 90° out of phase with the signal developed by antenna 10b. Accordingly, the signal component out of phase shifter 11 may be represented as $jE_y$. Signal components $E_x$ and $jE_y$ are applied to summer circuit 12 wherein they are linearly added to produce an output signal equal to $E_x + jE_y$. $E_x + jE_y$ is a complex function and, as will be shown immediately below, $E_x + E_y$ is equal to $E \cos \theta e^{j\phi}$. More specifically, since $$E_x = E \cos \theta \cos \phi e^{jwt} \quad (1)$$

and $$E_y = E \cos \theta \sin \phi e^{jwt} \quad (2)$$

then $$E_x + E_y = E \cos \theta e^{jwt} + jE \cos \theta \sin \theta e^{jwt} \quad (4)$$

Factoring out the elements common to both terms, we have $$E_x + jE_y = E \cos \theta e^{jwt} (\cos \phi + j \sin \phi) \quad (5)$$

As is well known by those skilled in the mathematical arts, $$\cos \phi + j \sin \phi = e^{j\phi} \quad (6)$$

Accordingly, $$E_x + jE_y = E \cos \theta e^{j\phi} e^{jwt} \quad (7)$$

or, stated differently, the signal applied to mixer circuit 14a is $$E \cos \theta e^{j(wt+\phi)}$$

where $E \cos \theta$ is the magnitude or absolute value of the signal.

The signal generated by voltage-controlled oscillator 17a is also applied to mixer 14a and, as will be recognized by those skilled in the electronics art, the resultant intermediate-frequency signal; out of mixer 14a under these conditions of operation is $E \cos \theta e^{j(wt+\phi+\alpha)}$ where $\alpha$ is the phase angle between the two signal inputs to mixer 14a. It is thus seen that the signal out of summer circuit 12 is substantially the same as that out of mixer circuit 14a, a primary difference between them being one of phase. As will subsequently be shown, the signal out of mixer 14a is shifted in phase until it is in substantial phase agreement with the reference signal generated by stable oscillator 21.

The signal produced by mixer 14a, namely, $E \cos \phi e^{j(\omega t+\phi+\alpha)}$, is applied to phase detector 15a to which is also applied the reference signal generated by stable oscillator 21. In the phase detector, the phase of the mixer signal is compared with that of the reference signal and, in response thereto, a variable signal is produced by the phase detector whose amplitude and polarity reflect the phase of the mixer output relative to the reference signal. This variable signal is passed through low pass filter 16a which smooths the variable signal and thereby produces a difference or error signal which it applies to voltage-controlled oscillator 17a. In response to the magnitude and polarity of the error signal applied to it, oscillator 17a shifts the phase of its signal in a direction that will tend to reduce the error signal to zero. As a result, the error signal out of filter 16a is ultimately reduced to substantially zero and when this happens, the two signals applied to phase detector 15a are in phase with each other. This means that the signal out of mixer 14a and applied to summer circuit 22 is in phase with the reference signal generated by stable oscillator 21 and may be represented as $$E \cos e^{j(\omega t+\psi)}$$

where $\psi=\phi+\alpha$.

Directing attention now to antenna 10c, the signal $E_z$ developed by this antenna is $E \sin \theta e^{j\omega t}$, where $E \sin \theta$ is the magnitude or absolute value of the signal. This signal is applied to phase-locked loop 13b to which the reference signal out of stable oscillator 21 is also applied. Consequently, as before, the phase of the signal produced by the phase-locked circuit is shifted until the two signals applied to it are in phase with each other. In other words, a signal $$E \sin \theta e^{j(\omega t+\psi)}$$

is ultimately produced by mixer 14b, the magnitude of this signal being $E \sin \theta$. It should be noticed that the signal out of mixer 14b is also in phase with the signal produced by mixer 14a. Signal $$E \sin \theta e^{j(\omega t+\psi)}$$

is applied to phase shifter 18 which, in accordance with its design, shifts the phase of the applied signal by 90° so that the signal out of the phase shifter and applied to summer circuit 22 is $$jE \sin \theta e^{j(\omega t+\psi)}$$

The summer linearly adds the two signals applied to it, namely, signal $$E \cos \theta e^{j(\omega t+\psi)}$$

and signal $$jE \sin \theta e^{j(\omega t+\psi)}$$

to produce a single output signal $E_0$ which has substantially the same magnitude as the signal originally applied to the system, namely, a magnitude of E.

More specifically, since $$E_0 = E \cos \theta e^{j(\omega t+\psi)} + jE \sin \theta e^{j(\omega t+\psi)} \quad (8)$$

then, by factoring $$E_0 = e^{j(\omega t+\psi)} (\cos \theta + j \sin \theta) \quad (9)$$

which simplifies to $$E_0 = e^{j(\omega t+\psi)} e^{j\theta} \quad (10)$$

This, it will be recognized, may be reduced to $$E_0 = e^{j(\omega t+\psi+\theta)} \quad (11)$$

This last equation may, in turn, be finally simplified to $$E_0 = e^{j(\omega t+\beta)} \quad (12)$$

where $\beta = \psi + \theta^\phi + \theta + \alpha$.

Since communications apparatus to which the output of summer circuit 22 may be applied would be inherently insensitive to the phase angle, that is, responsive only to the signal's absolute value, then it will be seen from equation 12 that the desired result has been achieved namely, the signal developed at output terminal 23 in the arrangement described has the same magnitude as that of the incoming signal. This, of course, is true irrespective of the orientation of the antennas with respect to the incoming signal, a feat not heretofore obtainable in the prior art.

It was initially assumed that switch 20 was in an open condition. Assuming now that switch 20 is in a closed condition, it will be obvious that phase shifter circuit 18 is therefore by-passed, with the result that the output from mixer 14b is now also applied directly to summer 22. Consequently, the signal now applied to summer circuit 22 is $$E \sin \theta e^{j(\omega t+\psi)}$$

rather than $$jE \sin \theta e^{j(\omega t+\psi)}$$

The effect on the final output signal produced at output terminal 23 may be clearly indicated as follows:

$$E_0 = E \cos \theta e^{j(\omega t+\psi)} + E \sin \theta e^{j(\omega t+\psi)} \quad (13)$$

Factoring out the quantities common to both terms, we have $$E_0 = (\cos \theta + \sin \theta) E e^{j(\omega t+\psi)} \quad (14)$$

Since the communications apparatus is insensitive to phase angle, that is to say, since only absolute values are basically involved, then the output signal is:

$$E_0 = |\cos \theta + \sin \theta| E \quad (15)$$

It will be recognized by those skilled in mathematics that $$1.4E \geq E |\cos \theta + \sin \theta| \geq E \quad (16)$$

Accordingly, under these latter conditions, the magnitude of the signal produced at output terminal 23 is at least equal to the magnitude of the incoming signal and possibly greater. When it is greater, a gain has been realized.

Figure 3:
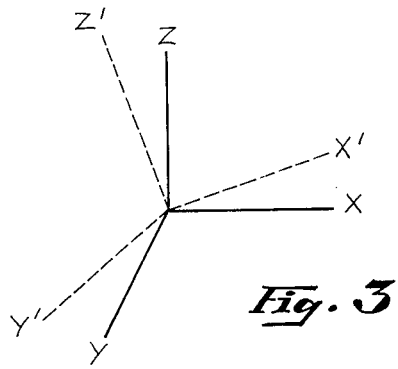
FIGURE 3 illustrates the manner in which reference systems may be displaced from each other to produce antenna gain.

A still larger gain may be obtained by employing a number of these antenna arrangements, with each such arrangement being positioned and oriented along a different reference system. More specifically, several antenna arrangements would be positioned and oriented along a corresponding number of reference systems, each system of reference being angularly displaced from another. Two orthogonal reference systems are illustrated by way of example in FIG. 3, the two systems having the same center of reference but oriented in different directions from each other. Thus, if two antenna arrangements of the type described were to be utilized, one such antenna arrangement would be mounted along the $x$, $y$ and $z$ axes and the other such antenna arrangement would be mounted along the $x'$, $y'$ and $z'$ axes.

Another embodiment of the present invention is shown in FIG. 4. As shown therein, this embodiment includes three phase-locked loops 13a, 13b and 13c, each of these phase-locked loops being identical with those previously described. Accordingly, no detailed description of these phase-locked loops is deemed necessary, especially so in order to avoid being redundant. Antennas 10a, 10b and 10c are respectively coupled to phase-locked loops 13a, 13b and 13c, specifically to mixers 14a, 14b and 14c therein. As may be expected, stable oscillator 21 is also connected to all the phase-locked loops, the oscillator being connected to phase detectors 15a, 15b and 15c therein. Finally, the outputs from the phase-locked loops, taken at the output ends of mixers 14a, 14b and 14c, are coupled to summer circuit 22 whose output, in turn, is output terminal 23.

In operation, each antenna and its associated phase-locked loop functions in the same manner as previously described. Accordingly, the signal applied to summer 22 by phase-locked loops 13a, 13b and 13c are respectively $$E \cos \theta \cos \phi e^{j(\omega t+\psi)}$$
$$E \cos \theta \sin \phi e^{j(\omega t+\psi)}$$

and $$E \sin \theta e^{j(\omega t+\psi)}$$

Since only absolute values are ultimately involved for the reasons mentioned before, then the final output signal at a receiver is $$E_0 = E[|\cos \theta||\cos \phi| + |\cos \theta||\sin \phi| + |\sin \theta|] \quad (17)$$

Factoring, we have $$E_0 = E[|\cos \theta|(|\cos \phi| + |\sin \phi|) + |\sin \theta|] \quad (18)$$

It will be recognized from Equation 16 that $$|\cos \phi| + |\sin \phi| \geq 1$$

Consequently, it must necessarily follow that $$|\cos\theta|(|\cos\phi|+|\sin\phi|) \geq |\cos\theta| \quad (19)$$

Since, furthermore, from Equation 16

$$|\cos\theta|+|\sin\theta| \geq 1$$

Then it must necessarily also follow that $$|\cos\theta|(|\cos\phi|+|\sin\phi|)+|\sin\theta| \geq |\cos\theta|+|\sin\theta| \geq 1 \quad (20)$$

Hence, $$|\cos\theta|(|\cos\phi|+|\sin\phi|)+|\sin\theta| \geq 1 \quad (21)$$

It is therefore seen from Equations 17 and 21 that here, too, a gain is realized since $$E_0 \geq E$$

Although a number of particular arrangements of the invention have been illustrated above by way of example, it is not intended that the invention be limited thereto. Accordingly, the invention should be considered to include any and all modifications, alterations or equivalent arrangements falling within the scope of the annexed claims. For example, the embodiment of FIG. 2 may be modified so that signals $E_x$ and $E_z$ or signals $E_y$ and $E_z$ are added together instead of signals $E_x$ and $E_y$. Any such modification would, of course, require that phase shifter 11 and summer 12 be connected to antenna 10c. Again by way of example, the phase-locked loops of FIGS. 2 and 4 may be modified by replacing the voltage-controlled oscillators and the mixer circuits therein with a phase-shifter network. Where such a substitution is made in the embodiment of FIG. 2, one phase-shifter would be connected between low-pass filter 16a and summer 12 and phase-detector 15a while the other phase-shifter would be connected between low-pass filter 16b and antenna 10c and phase-detector 15b. In the FIG. 4 embodiment, phase-shifters would respectively be connected between antennas 10a, 10b and 10c and phase-detectors 15a, 15b and 15c and they would also be directly connected to filters 16a, 16b and 16c. Thus, the voltage-controlled oscillators and the mixers would be out of these embodiments completely and replaced with phase-shifter circuits.

Finally, it should also be mentioned that while the invention has been described in connection with satellites and other spacecraft, it may also be used to great advantage with other types of vehicles, such as ships, tanks, etc.

Having thus described the invention, what is claimed as new is:

1. An antenna arrangement for producing an optimum output signal irrespective of the direction from which an intercepted signal is received, said antenna arrangement comprising: three antennas respectively positioned and oriented along the three axes of a three-dimensional orthogonal system of reference, said three antennas respectively producing three signals that are, in accordance with said reference system, axial components of the intercepted signal; first means coupled to one of said antennas for shifting the phase of the signal component therefrom by ninety degrees; second means coupled to another of said antennas and to said first means for adding the signal components therefrom to produce a first output signal; third means coupled to the third of said antennas and to said second means for shifting the phases of said first output signal and the signal component from said third antenna until they are in phase with each other; said third means including a first phase-locked circuit coupled to said second means for shifting the phase of said first output signal and a second phase-locked circuit coupled to the third of said antennas for shifting the phase of the signal component from said third antenna, and a reference signal source coupled to both the first and second phase-locked circuit to provide a common reference phase to which the first output signal and the signal component from the third antenna are shifted; fourth means coupled to said third means for further shifting the phase of the signal component from said third antenna by ninety degrees; and fifth means coupled to said third and fourth means for adding the signals therefrom to produce a second output signal that is optimum irrespective of the direction from which the intercepted signal came.

2. An antenna arrangement for producing an optimum output signal irrespective of the direction from which an intercepted signal is received, said antenna arrangement comprising: three antennas respectively positioned and oriented along the $x$, $y$ and $z$ axes of a three-dimensional orthogonal system of reference to respectively produce $x$, $y$ and $z$ components of the intercepted signal; a first phase-shifter circuit adapted to shift the phase of signals applied to it by ninety degrees, said first phase-shifting circuit being coupled to one of said three antennas for shifting the phase of the signal component therefrom; a first summing circuit coupled to said first phase-shifter circuit and to a second of said three antennas for adding the signal components therefrom to produce a combined signal; a reference signal source; a first phase-locked loop circuit including a voltage controlled oscillator, a mixer for combining the output of the voltage controlled oscillator with the combined signal from said first summing circuit, phase detector means for coupling to said mixer and the reference signal source for detecting phase differences between the output of the mixer and the reference signal source, and means for coupling the output of the phase detector to the voltage controlled oscillator to shift the phase of the output of the mixer to substantial phase agreement with the reference signal source; a second phase-locked loop circuit including a voltage controlled oscillator, a mixer for combining the output of the voltage controlled oscillator with the signal component from the third antenna, phase detector means coupled to said mixer and the reference signal source for detecting phase differences between the output of the mixer and reference signal source, and means for coupling the output of the phase detector to the voltage controlled oscillator to shift the phase of the output of the mixer to substantial phase agreement with the reference signal source; a second phase-shifter circuit adapted to shift the phase of signals applied to it by ninety degrees, said second phase-shifter circuit being coupled to the second phase-lock of loop circuit to receive the signal component from said third antenna, whereby the phase of said component is shifted by ninety degrees; and a second summing circuit coupled to said first phase-locked loop and to said second phase-shifter circuit for adding said combined signal to said signal component to produce an output signal that is optimum irrespective of the direction from which the intercepted signal came.

3. An antenna arrangement for producing an output signal whose magnitude is at least $E$ irrespective of the direction from which an intercepted signal is received, where $E$ is the magnitude of the intercepted signal, said antenna arrangement comprising: three antennas positioned and oriented along the $x$, $y$ and $z$ axes of a three-dimensional orthogonal system of reference, said antennas respectively producing signal components whose magnitudes are equal to $E\cos\theta\cos\phi$, $E\cos\theta\sin\phi$, and $E\sin\theta$ in response to the signal intercepted, where $\theta$ and $\phi$ are respectively the angles between the $xy$ and $xz$ planes and the direction from which the intercepted signal is received; a first phase-shifter circuit for shifting the phase of the signal component whose magnitude is $E\cos\theta\sin\phi$ by 90°; a first summer coupled to linearly add the signal component whose magnitude is $E\cos\theta\cos\phi$ to the signal component out of said first phase-shifter circuit, the resultant combined signal having a magnitude of $E\cos\theta$, means for bringing the signal component whose magnitude is $E\sin\theta$ into phase agreement with the combined signal out of said first summer whose magnitude is $E\cos\theta$; said last means including first and second phase-locked circuits coupled respectively to the first summer and the third antenna and a reference signal source coupled to the first and second phase-locked circuits for establishing a common phase relationship for the combined signal $E \cos \theta$ and the signal component, $E \sin \theta$, a second phase-shifter circuit coupled to said means for shifting the phase of the signal component whose magnitude is $E \sin \theta$ by 90°; and a second summer for linearly adding the signal out of said means whose magnitude is $E \cos \theta$ to the signal component out of said second phase-shifter circuit, the resultant output signal having a magnitude that is substantially equal to E.

4. An antenna arrangement for producing an optimum output signal irrespective of the direction from which an intercepted signal is received, said antenna arrangement comprising: three antennas respectively positioned and oriented along the $x$, $y$ and $z$ axes of a three-dimensional orthogonal system of reference to respectively produce $x$, $y$ and $z$ components of the intercepted signal; a first phase-shifter circuit adapted to shift the phase of signals applied to it by ninety degrees, said first phase-shifting circuit being coupled to one of said three antennas for shifting the phase of the signal component therefrom; a first summing circuit coupled to said first phase-shifter circuit and to a second of said three antennas for adding the signal components therefrom to produce a combined signal; means coupled to the third of said three antennas and to said first summing circuit for shifting the phases of said combined signal and the signal component from said third antenna until they are in phase with each other; said means includes a unit for generating a stable reference signal; a pair of phase-locked circuits for respectively shifting the phase of said combined signal and the phase of the signal component produced by said third antenna until these signals are in phase with said reference signal, one of said phase-locked circuits being coupled to said unit and to said first summing circuit and the other of said phase-locked circuits being coupled to said unit and to said third antenna, a second phase-shifter circuit adapted to shift the phase of signals applied to it by ninety degrees, said second phase-shifter circuit being coupled to said means in such a manner as to receive only the signal component from said third antenna, whereby the phase of said component is shifted by ninety degrees; and a second summing circuit coupled to said means and to said second phase-shifter circuit for adding said combined signal to said signal component to produce an output signal that is optimum irrespective of the direction from which the intercepted signal came.

References Cited by the Examiner

UNITED STATES PATENTS

| | | | |
|---|---|---|---|
| 1,874,866 | 8/1932 | Beverage et al. | 325—372 X |
| 1,892,221 | 12/1932 | Runge | 343—853 |
| 3,036,210 | 5/1962 | Lehan | 325—367 |

FOREIGN PATENTS 834,979   5/1960   Great Britain.

OTHER REFERENCES

"Simplified Diversity Communication System . . ." by F. J. Altman and W. Sichak, Electrical Communication, June 1956, pages 151 and 160.

DAVID G. REDINBAUGH, *Primary Examiner.*

S. B. PRITCHARD, *Examiner.*

W. J. SIMMONS, W. V. WARREN, E. C. MULCAHY, JR., B. V. SAFOUREK, *Assistant Examiners.*